United States Patent
Norman

Patent Number: 5,768,790
Date of Patent: Jun. 23, 1998

[54] ANGLE INDICATOR FOR PIPE BENDERS

[76] Inventor: Robert C. Norman, Rt. 1, Box 50, Macclenny, Fla. 32063

[21] Appl. No.: 740,157

[22] Filed: Oct. 28, 1996

[51] Int. Cl.[6] .................................................. B43L 7/00
[52] U.S. Cl. ................................ 33/451; 33/334; 33/370; 33/529
[58] Field of Search ........................... 33/1 N, 333, 334, 33/343, 370, 371, 391, 451, 424, 529

[56] References Cited

U.S. PATENT DOCUMENTS

| | | | |
|---|---|---|---|
| 709,487 | 9/1902 | Hughes | 33/451 |
| 2,677,184 | 5/1954 | Lindenbein | 33/334 |
| 2,932,225 | 4/1960 | Gardner . | |
| 3,009,250 | 11/1961 | Schock | 33/451 |
| 3,590,617 | 7/1971 | Mount . | |
| 4,009,602 | 3/1977 | Linquist | 33/529 |
| 4,052,881 | 10/1977 | Mount . | |
| 4,425,784 | 1/1984 | D'Gerolamo | 33/334 |
| 4,622,837 | 11/1986 | Bergman | 33/370 |
| 4,712,307 | 12/1987 | Kish | 33/451 |
| 4,729,173 | 3/1988 | Wilson | 33/451 |
| 5,167,075 | 12/1992 | Weldy et al. | 33/343 |
| 5,446,969 | 9/1995 | Terenzoni | 33/451 |
| 5,452,522 | 9/1995 | Kook et al. | 33/451 |

*Primary Examiner*—Daniel G. DePumpo
*Attorney, Agent, or Firm*—Steven R. Scott

[57] ABSTRACT

An angle indicator for connection to a pipe bender having an elongated handle or the like, which is generally characterized by the presence of: (a) a pivoting linear member having a spirit level thereon/therein for determining when it is horizontal; (b) which pivoting linear member is pivotally attached to another linear member which includes means by which it may be attached to the handle of the pipe bender being used in such manner that it is horizontal when the pipe bender is initially affixed to a pipe to be bent; and (c) means by which the relation between the two linear members may be nonpermanently set at a preselected angle.

6 Claims, 3 Drawing Sheets

ANGLE INDICATOR FOR PIPE BENDERS

BACKGROUND

1. Field of the Invention

This invention relates to the field of manual pipe and/or conduit bending tools of the type utilized, principally by electricians, for the bending of pipe/conduit to predetermined angles required for particular installation situations. More specifically, it describes an angle indication device that may be permanently (albeit removably) affixed to the handle of a standard pipe bender, and is then capable of being utilized in concert with said bender for the effectuation of precision pipe/conduit angle bends.

2. Prior Art in the Field

The typical manual pipe bender in general usage features an arcuate head with a lever arm extending from the approximate center of said arcuate head radially through the center of the arc defined by said arcuate head to its point of termination in a handle to be gripped by the user. In use, the pipe/conduit to be bent is placed in a horizontal position (usually on a ground surfaced) and the engagement end of said arcuate head is fastened to the pipe at the location of the desired bend. When attached in this manner, the lever arm is inclined at approximately thirty degrees from the vertical. It is then pulled upward by the user (who will typically be standing on the pipe/conduit and/or the other end of the pipe bender) until the pipe/conduit has reached the desired angle of bend.

Judging and determining when the pipe/conduit being bent has reached the desired angle is often difficult. Thus, a variety of methods and apparatus have been developed to facilitate precise pipe bending to a predetermined angle. As will be noted upon review of a representative sampling of prior art, such devices generally tend to: (i) incorporate an angle determination means in the head of the pipe bending device; or (ii) provide a separate angle determination means for attachment to the pipe/conduit being bent. Devices for such purpose that attach to the lever arm of the pipe bending device, as is the case in the instant invention, are extremely rare.

The preponderance of prior art devices rely on the incorporation of angle determination devices in the head of the pipe bending apparatus or, alternatively, provide such devices with means for attachment of same to the conduit/pipe being bent. Examples of the first alternative are the most common and may be seen in the patent for a "Tube Bending Device" issued to Gardner in 1960 (U.S. Pat. No. 2,932,225); the patent for a "Pipe bending Tool with Improved Angular Indicator" issued to Mount in 1971 (U.S. Pat. No. 3,590,617); the patent for a "Pipe and Tube Bender" issued to Crouse in 1975 (U.S. Pat. No. 3,906,778); and the "Improved Process for Providing Offset Bends of the Correct Dimension in Pipe and the Like" issued to Mount in 1977 (U.S. Pat. No. 4,052,881). The Gardner patent describes a standard pipe bending tool of the type previously described which incorporates an adjustable spirit level in its arcuate head portion as a means for determining when the desired angle has been reached. The two Mount patents describe a standard pipe bending tool which incorporates an arcuate tube and ball (said tube bearing degree markings) in its arcuate head as its means for determining when the correct angle has been reached. The Crouse patent describes a variant of the standard pipe bending tool which, like Gardner, utilizes spirit levels incorporated into its head portion as a means for determining when the desired angle has been reached. Examples of the second generally used alternative may be seen in the patents issued to Parker for a "Level for Use in Bending Conduit"(U.S. Pat. No. 5,058,407) and to Weldy et al. for a "Pipe Bending Level"(U.S. Pat. No. 5,167,075). Both patents describe devices having spirit levels for attachment to the ends of the pipe/conduit being shaped.

The previously described devices tend to be deficient in use for a variety of reasons. Those incorporated in the pipe bending device cannot be moved to another pipe bender (and therefore lack portability), while both types tend to place the angle measurement and determination means at a substantial distance from the user of the pipe bender. In this position the angle measurement and determination means is more difficult to access by the user and is, more importantly, more difficult to see. The only real remedy for these problems is to create a portable angle measurement and determination means that can be nonpermanently affixed at a location closer to the handle of the lever arm. However, only one prior apparatus known to the inventor has sought to resolve the deficiencies in prior art in this manner. It is described in the patent for "Angle Indicator Attachable to Tube Benders and the Like" issued to D'Geralamo in 1984. The D'Geralamo patent describes a device for indicating the angular movement of a tube bender comprised of (i) a plate assembly having an alignment groove for attaching the plate assembly to the elongated handle of a tube bender, and (ii) an arcuate spirit level with an angular movement position indicator air bubble inside. The D'Geralamo device does not, however, exhaust the novel and nonobvious possibilities for devices of this general type.

SUMMARY AND OBJECTS OF THE INVENTION

It is an object of the instant invention to provide an angle indicator attachable to a tube bender that quickly, simply and easily: (1) attaches to the lever arm of standard pipe benders and adjusts for usage with same; (2) may be set for the desired angle of bend; and (3) may be easily read by the user such that the user can quickly, simply and easily determine when the desired angle has been reached. It is a further object of the instant invention to provide such features in a device that is rugged in use as well as being simple and inexpensive in manufacture. The aforesaid objects are accomplished by the provision of a device that is, in its preferred embodiment, comprised of: (1) a generally "L" shaped element formed from a vertical member joined at right angles to a horizontal member; (2) means by which the end of said vertical member distant from said horizontal member may be adjustably attached to the lever arm of a pipe bender in such manner that the vertical member is perpendicular to the pipe being bent when the pipe bender is attached in its normal manner thereto; (3) a linear member having a first and second end, which linear member is pivotally attached by its first end to the end of the horizontal member distant from the vertical member, crosses the vertical member, and may be affixed at varying angles (selected by the user) relative to said horizontal member; (4) angle indication markings on the vertical member indicating the angle of the linear member relative to the horizontal member; and (5) a levelling device affixed in or to said vertical member (preferably at the second end thereof) in such manner as to be visible to the user, which levelling device indicates when the linear member is horizontally level.

DETAILED DESCRIPTION OF THE PREFERRED EMBODIMENT

Figure 1:
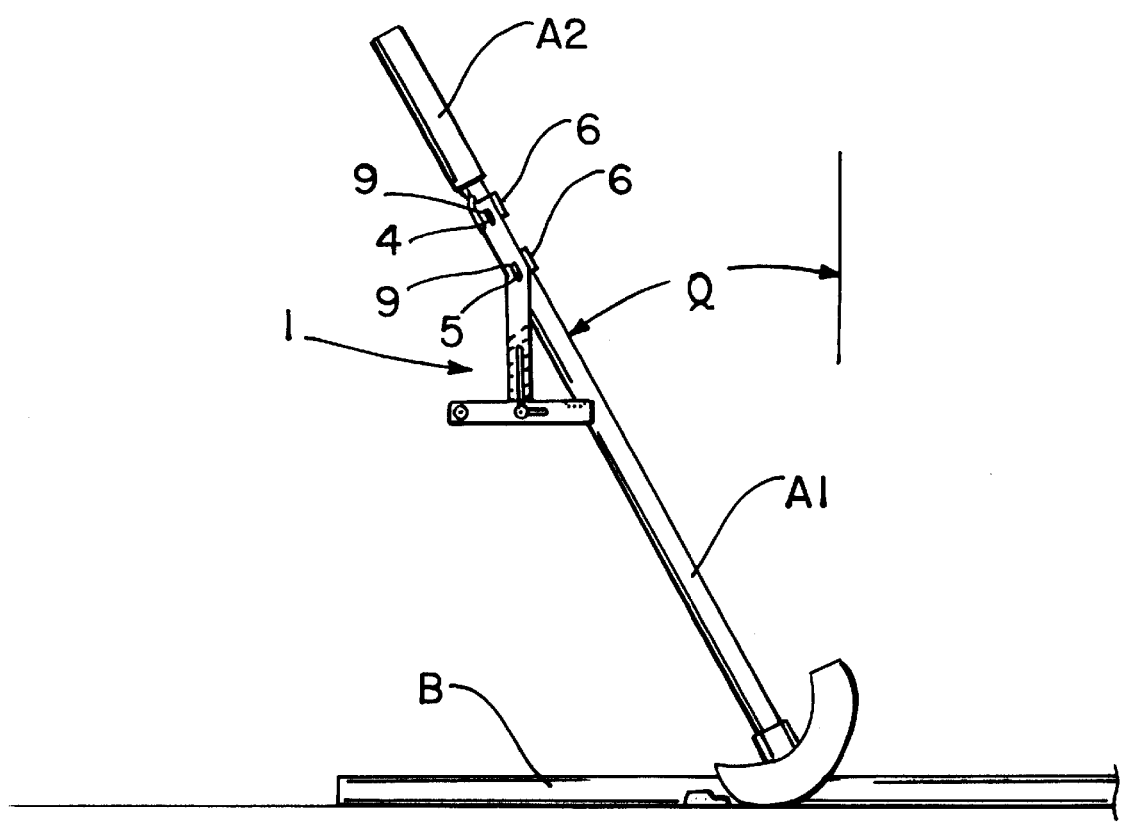
FIG. 1 is a distant view of the instant invention shown in its operative position attached to the lever arm of a pipe bender.
Figure 2:
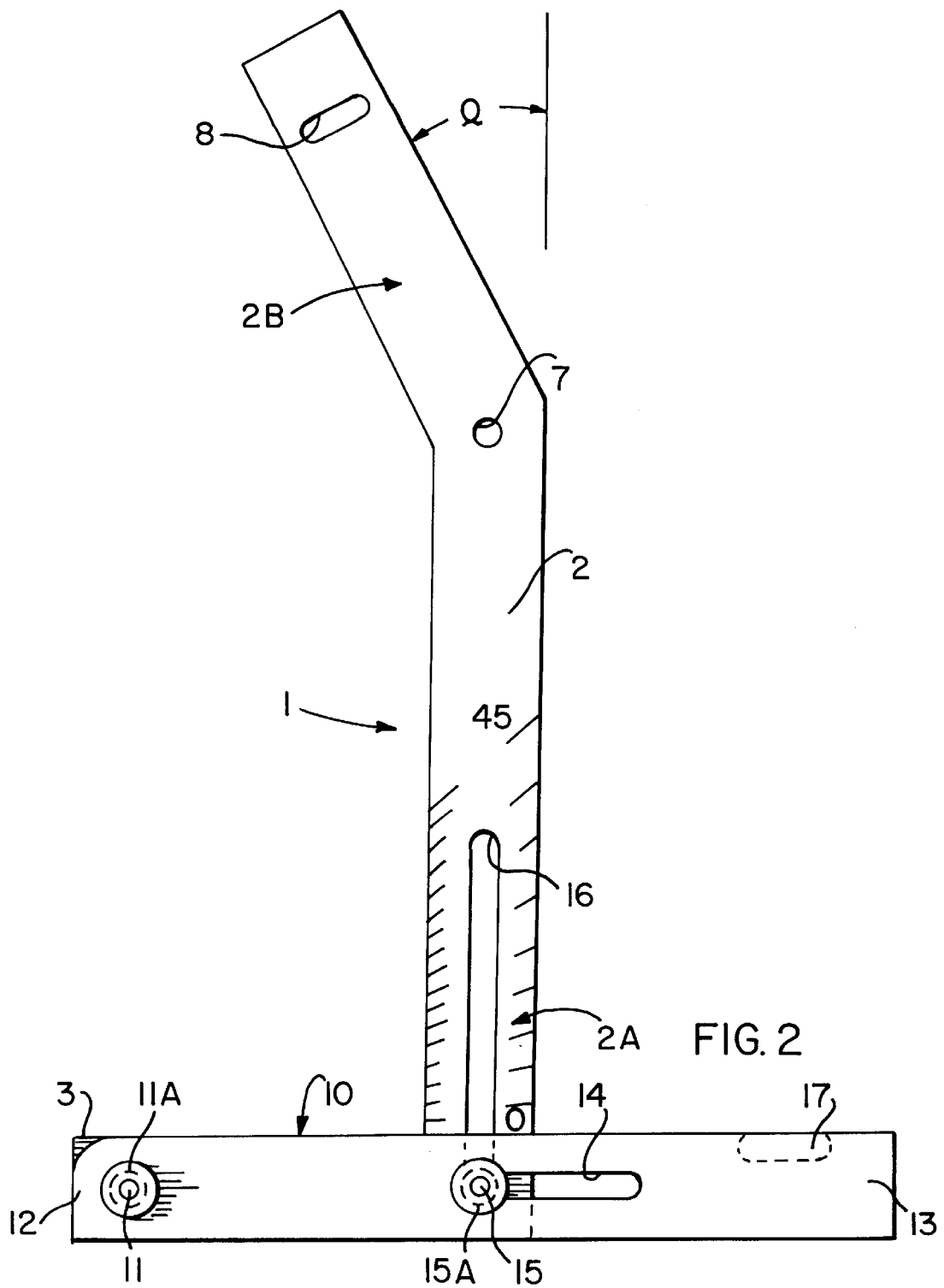
FIG. 2 is a first magnified view of the instant invention providing a more detailed showing of its operative elements.
Figure 3:
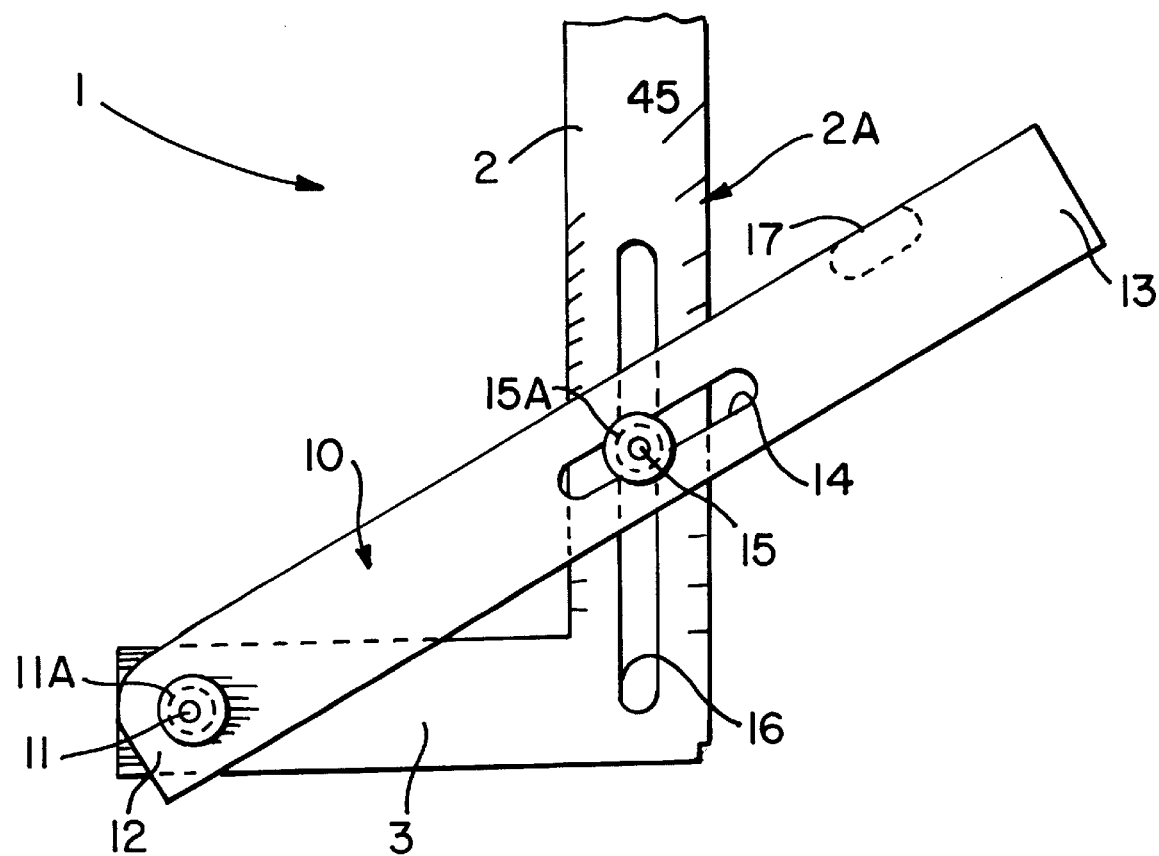
FIG. 3 is a second magnified view showing the lower portion of the instant invention with the members thereof positioned differently than in FIG. 2.

As will be noted from FIGS. 1, 2 and 3, the instant invention is straightforward in design and operation. Its foundational component is a generally "L" shaped base element (indicated generally by arrow 1). This element is comprised of a generally vertical member 2 and a horizontal member 3. The generally vertical member 2 is, in turn, subdividable into a vertical portion (indicated by arrow 2a) and an inclined portion (indicated by arrow 2b). (All of these elements are denominated in FIGS. 2 and 3, but some have been purposely left out of FIG. 1, in order to avoid over crowding of the drawing figure).

The inclined portion 2b departs from the upright vertical portion 2a by an angle Q of approximately 30 degrees. This angle has been chosen to match the design angle Q for attachment of the typical pipe bender (i.e. the angle by which pipe bender handle A1 departs from the vertical when initially attached to a pipe B that is to be bent, as illustrated in FIG. 1). First threaded mounting pin 4 and second threaded mounting pin 5 may be attached by metal strapping 6 or any of several other means well known in the mechanical arts to lever arm A1 proximate the handle A2 thereof. A round perforation 7 and an arcuate perforation 8 are provided so that the inclined portion 2b may be affixed by wingnuts 9 to lever arm A1 via first threaded mounting pin 4 and second threaded mounting pin 5. The arcuate perforation 8 allows the position of the device to be adjusted relative to the lever arm A1 so as assure that, when the pipe bender handle A1 is in its normal starting position engaged to begin bending a pipe B, the vertical member 2 and the horizontal member 3 are, respectively, perpendicular and parallel to the pipe B being bent. (The size of the arcuate perforation illustrated allows approximately 10 degrees of adjustability for this purpose). This, in turn, assures that the angle of bend of the said pipe matches the angle chosen and marked on the invention.

Linear element 10 is joined at its first end 12 to the horizontal member 3 via pivoting bolt 11 which has a first knurled clamping nut 11a affixed thereon. The linear element 10 crosses the vertical member 2 at its second end 13, and is provided with a linear slot 14. A sliding bolt 15 having a second knurled clamping nut 15a extends through said linear slot 14 and the vertical slot 16 provided in the vertical member 2. As will be evident upon review of the drawing figures, the aforesaid features allow the linear element 10 to be fixed to the vertical member 2 at a range of angles (with respect to said vertical member 2 and horizontal member 3) that may be selected by the user. Vertical member 2 is provided with angle markings (which are not generally numbered, but are illustrated in FIG. 2) indicating the angle between the linear element 10 and the horizontal member 3. A spirit level 17 of the type well known in the mechanical arts is provided at the second end 13.

The invention illustrated is used in the following manner. First, it is attached to the handle of a pipe bender and adjusted for use therewith. Once this is accomplished, it is positioned for usage on that pipe bender for all future use. Second, it is adjusted for the angle of each particular bend as same is to be made.

The first step may be, as previously outlined, accomplished in a straightforward manner. First, the two segments of metal strapping 6 with threaded mounting pins 5 are affixed to the handle A1 of a pipe bender. Second, the round perforation 7 in vertical portion 2a and the arcuate perforation 8 in inclined portion 2b of the vertical member 2 is fitted over the aforesaid threaded mounting pins 5 as illustrated in FIG. 1. Wingnuts 9 may then be tightened so as to be relatively snug, but not completely binding. Third, the pipe bender is then affixed in its operative position to a segment of pipe to be bent (as also illustrated in FIG. 1). Fourth, once this is accomplished, the angle of the inclined portion 2b is adjusted until the spirit level 17 shows the linear element 10 to be horizontal (thereby also assuring that the horizontal member 3 is horizontal). Upon accomplishing the foregoing, the aforesaid wingnuts 9 are tightened and the instant invention is correctly positioned for all future usage on the pipe bender to which it is attached.

To make a precision bend, the linear member 10 is then raised to the desired angle for the bend (a 30 degree angle from horizontal being shown, by way of illustration, in FIG. 3). The first knurled clamping nut 11a and second knurled clamping nut 15a are then tightened to hold linear member 10 in said fixed angular relationship with regard to the horizontal member 3. The pipe bender is then utilized in its normal fashion, bending the pipe until the spirit level 17 shows that the linear member 10 has reached the horizontal. At this point, the precision bend has been accomplished and the pipe bender may be removed.

As will be obvious upon review of the foregoing, numerous variations are possible without exceeding the scope of the inventive concept embodied herein, the same being more particularly described in the claims that follow.

I claim:

1. An angle indicator for connection to a pipe bender having an elongated handle or like device, comprising:
    (a) A generally vertical member, said vertical member having an upper end and a lower end;
    (b) means for connecting said generally vertical member to a pipe bender handle;
    (c) a generally horizontal member having one end distant from said vertical member and another end proximate said vertical member, said horizontal member being rigidly joined by the end proximate said vertical member at a 90 degree angle to said vertical member;
    (d) a linear member having a first end by which it is pivotally connected to the end of said horizontal member distant from said vertical member in such manner as to remain parallel to the plane defined by said vertical member and said horizontal member when it is rotated on said pivot, and having a second end which remains adjacent to said vertical member when said linear member is rotated on said pivot;
    (e) means by which said linear member can be nonpermanently affixed at a selected angle in relation to said horizontal member;
    (f) degree markings provided on said vertical member such that the angle between the linear member and the horizontal member is indicated by said markings; and
    (g) a spirit level provided in said linear member, which spirit level indicates when the linear member is horizontal.

2. An angle indicator for connection to a pipe bender having an elongated handle or like device as described in claim 1, wherein a portion of said generally vertical member at its upper end is inclined from the vertical by approximately thirty degrees, said inclined portion also being utilized for connecting said generally vertical member to a pipe bender handle.

3. An angle indicator for connection to a pipe bender having an elongated handle or like device as described in claim 1, further comprising means for adjusting the angle between the vertical member and a pipe bender handle.

4. An angle indicator for connection to a pipe bender having an elongated handle or like device as described in claim 2, further comprising means for adjusting the angle between the vertical member and a pipe bender handle.

5. An angle indicator for connection to a pipe bender having an elongated handle or like device, comprising:
   (a) A first member, which member is generally linear and has a first end and a second end;
   (b) a second member, which member is generally linear and is pivotally connected at one of its ends to the second end of said first member, said second member having means by which it can be determined when it is horizontal;
   (c) means by which said second member can be nonpermanently affixed at a selected angle in relation to said first member;
   (d) angle determination means by which the angle between the first member and the second member can be determined; and
   (e) attachment means for nonpermanent attachment of the first member to a pipe bender handle in such manner that the first member is horizontal when such pipe bender is initially connected to a pipe to be bent.

6. An angle indicator for connection to a pipe bender having an elongated handle or like device as described in claim 5, wherein the means by which it can be determined when the second member is horizontal is a spirit level.

\* \* \* \* \*